United States Patent [19]

Vatin

[11] 4,037,500
[45] July 26, 1977

[54] PROCESS AND APPARATUS FOR CONTINUALLY CUTTING STACKED GLASS SHEETS

[75] Inventor: Raymond Vatin, Thourotte, France

[73] Assignee: Saint-Gobain Industries, Neuilly-sur-Seine, France

[21] Appl. No.: 669,595

[22] Filed: Mar. 23, 1976

[30] Foreign Application Priority Data

Mar. 27, 1975 France .................... 75.09733

[51] Int. Cl.² .................... B26D 3/08; B65H 3/08
[52] U.S. Cl. .................... 83/7; 83/12; 83/29; 83/36; 83/100; 83/152; 83/281
[58] Field of Search ........... 83/6, 7, 12, 24, 29, 83/34, 36, 100, 152, 281, 417, 411 A

[56] References Cited

U.S. PATENT DOCUMENTS

| 3,570,563 | 3/1971 | Hall .................... 83/411 A |
| 3,830,121 | 8/1974 | Makeev et al. .................... 83/281 X |

Primary Examiner—Willie G. Abercrombie
Attorney, Agent, or Firm—Pennie & Edmonds

[57] ABSTRACT

A stack of glass blanks is moved on a support into position beneath a head carrying a cutting tool. The uppermost blank is scored by the cutting tool under guidance of a templet and the tool withdrawn. Pick-up means, advantageously with suction cups, removes the scored blank laterally from the stack and the stack and cutting head are brought closer together by a distance equal to the thickness of a blank, preferably by raising the stack support. The next blank is then scored and the operation repeated until all the blanks in the stack have been scored and removed, whereupon a new stack is brought into position. Means are provided for centering the stack with respect to the cutting head, and centering means adjacent the top of the stack centers the uppermost blank with respect to the cutting head, advantageously by jack means positioned on the sides of the stack.

14 Claims, 3 Drawing Figures

PROCESS AND APPARATUS FOR CONTINUALLY CUTTING STACKED GLASS SHEETS

The present invention relates to a process for continually cutting stacked glass sheets. The invention also relates to apparatus for implementing this process.

In order to produce glass sheets having a given shape, for example automobile windows, it is general practice to score a sheet of glass known as a "blank" and then to separate the scored portions at a "breaking" station.

The blanks per se usually consist of rectangular panels cut from a glass ribbon and, as will be appreciated, the scoring and breaking processes entail repeated handling operations. The stacked blanks, which are delivered to the scoring station, are picked up and placed individually on a pad on which the cutting operation is effected.

The object of the present invention is to simplify these operations by means of a process and apparatus for cutting a blank while it is still disposed at the top of the stack.

In accordance with the process of the present invention, a stack of blanks is moved into position beneath a cutting head equipped with a reference templet and drive means, the scoring tool of the cutting head is brought into contact with the blank disposed at the top of the stack and the requisite scoring line is produced under guidance of the templet, the scoring tool is withdrawn from the blank and the blank is removed from the stack to expose the next uppermost blank, the stack and the cutting head are moved closer to one another by a distance corresponding to the thickness of a blank, and the scoring cycle is repeated.

The relative movement of the stack and cutting head can be effected either by raising the stack of blanks by an amount equal to the thickness of a blank or by lowering the cutting head by a corresponding distance.

The apparatus of the invention comprises a cutting head equipped with drive means and a reference templet, support means for supporting a stack of blanks beneath the cutting head, means for actuating the cutting head to score a line in the uppermost blank of the stack, pick-up means for picking up and removing the uppermost blank from the stack after the scoring thereof, and means for moving the cutting head and the stack of blanks closer to one another by a distance corresponding to the thickness of a blank to bring the succeeding blank into position for scoring. Synchronization means for synchronizing the action of the different elements is provided as required.

The means for picking up the blanks advantageously is a suction cup system disposed above the stack of blanks and movable to a position over the stack for picking up a blank, and to a position laterally away from the stack. The system comprises, for example, two parallel arms bearing suction cups and supported by a carriage mounted on a guide path leading to a breaking station.

The means for moving the cutting head and the stack of blanks closer together may include, for example, jacks supporting the stack support means and actuated step-by-step.

Centering means for centering the stack, on the one hand, and the blank disposed at the top of the stack of blanks, on the other hand, with respect to the cutting head, are advantageously provided.

A specific embodiment of the apparatus is shown in the accompanying drawings, in which.

Figure 1:
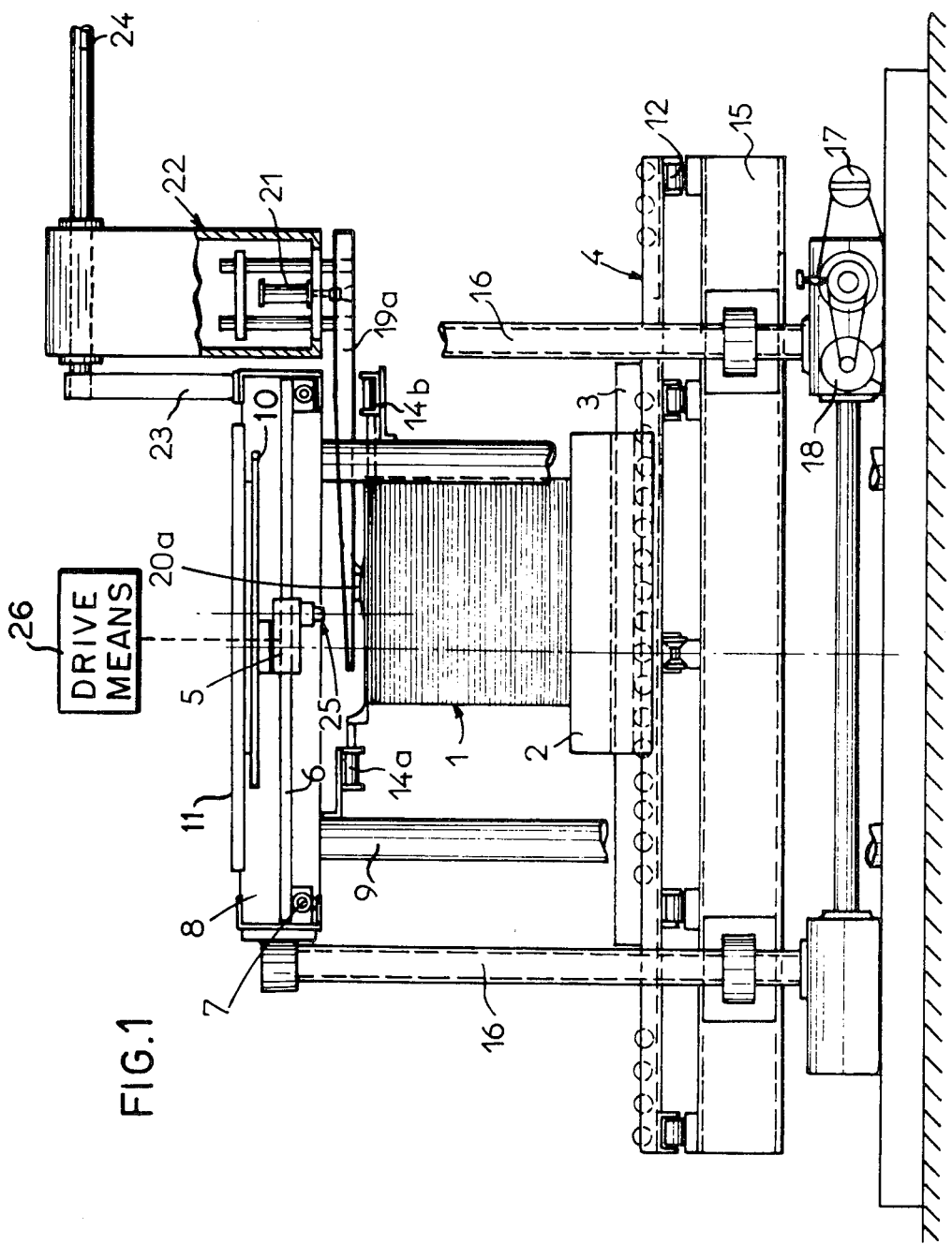
FIG. 1 is an elevational longitudinal view of the apparatus.
Figure 2:
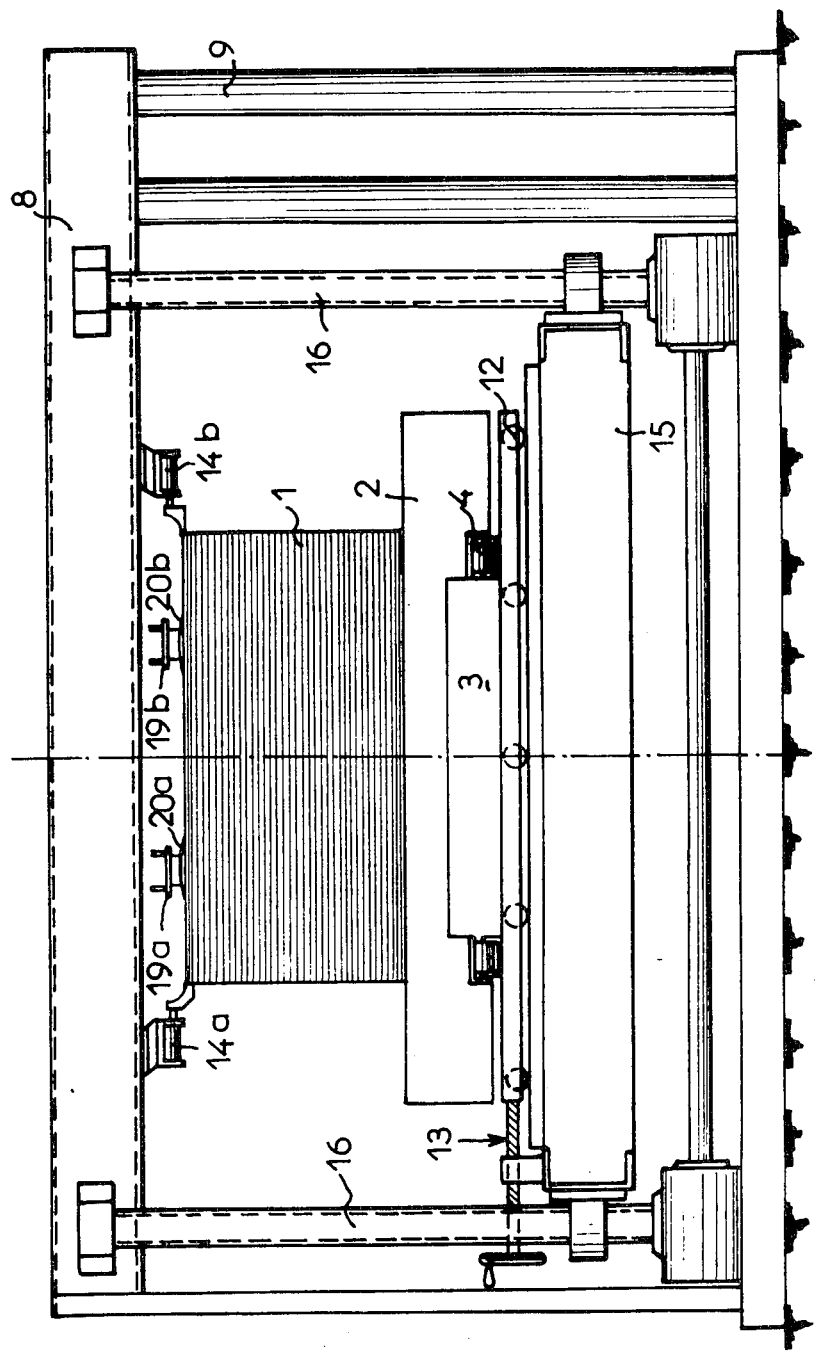
FIG. 2 is an elevational view of the apparatus taken at right angles to FIG. 1.
Figure 3:
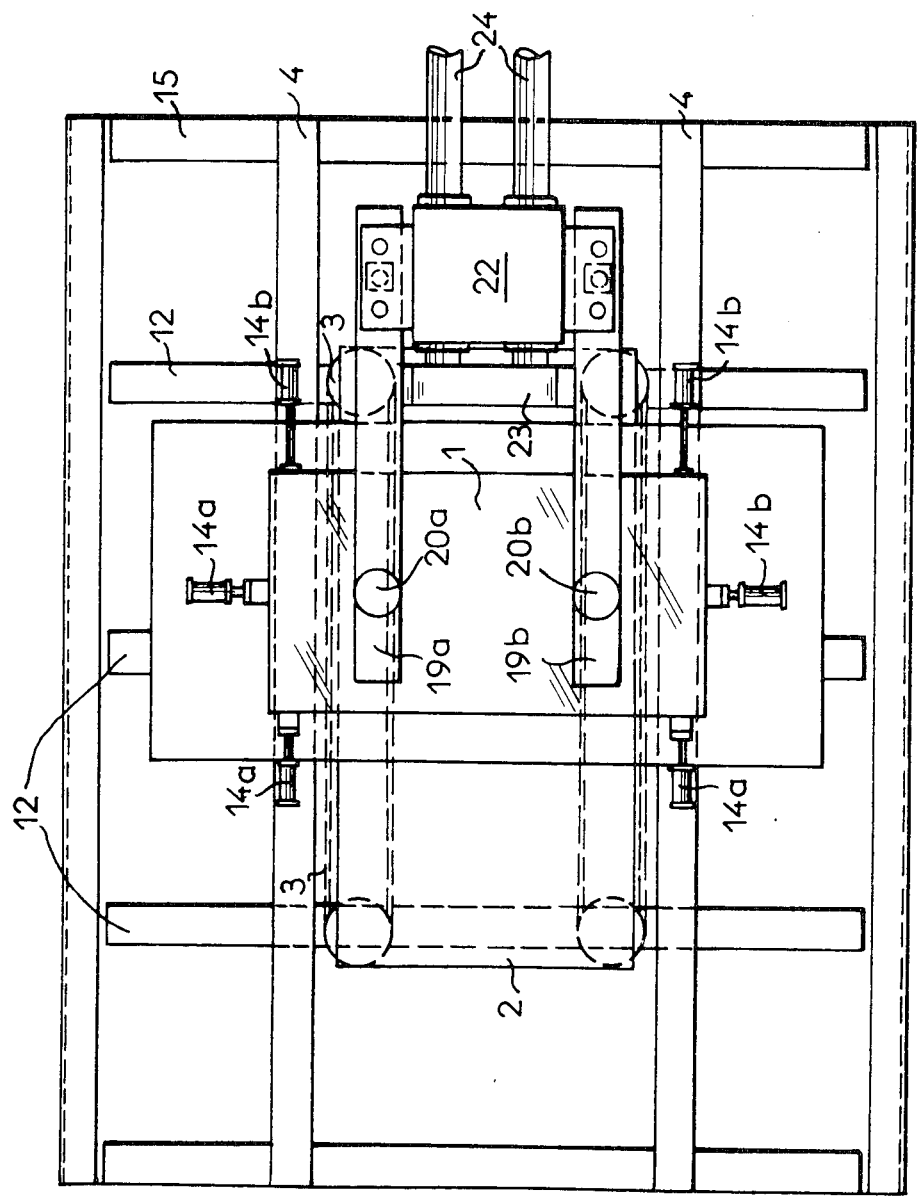
FIG. 3 is an overhead view of a part of the apparatus.

A stack of blanks 1 rests on a pallet 2 which is movable by means of chain drive means 3 on a longitudinal roller track 4 beneath a cutting head 5. The head is supported by a bridge 6 rolling on bearings 7 on a crossbeam 8 mounted on piers 9. The head is guided by a templet 10 removably mounted on a support 11 which is rigidly connected to the crossbeam 8. Suitable drive means, indicated at 26, is provided for the cutting head.

The roller track 4 is in turn carried by a lateral roller track 12 to enable the pallet 2 to be longitudinally centered beneath the cutting head 5 by means of lead screw means 13. Jacks 14a and 14b disposed on the four sides of the stack in the region of the top of the stack make it possible to accurately center the blank at the top of the stack beneath the head 5 and thus keep it in position.

The different roller tracks are supported by a platform 15 vertically displaced by the screw jacks 16 equipped with a step-by-step control means 17. A hydro-mechanical motor 18, which is designed to ensure the rapid return of the platform to the lower position, is also provided. The motor may be of a conventional type and need not be described in detail.

A pick-up means for picking up and handling the blank disposed at the top of the stack 1 comprises two parallel arms 19a and 19b, each equipped with a gripping suction cup 20a and 20b, respectively. Two jacks 21 are designed to bring the suction cups into contact with the blank to be picked up. A carriage 22, on which the jacks 21 and the arms 19a and 19b are mounted, is supported by a support 23 mounted on the side of the crossbeam 8 and is adapted to slide on the guides 24 parallel to the longitudinal roller track 4.

The apparatus operates in the following manner: The pick-up device is moved to the side and the scoring tool 25 on head 5 is brought into contact with the blank on top of the stack 1 (previously centered) and which is held by the jacks 14a and 14b. The head 5 is then actuated to score the blank according to the shape of the templet 10. When the scoring operation has been completed, the tool 25 and the jacks 14a, 14b are retracted, and the carriage 22 is driven to move the arms 19a and 19b over the stack 1. The jacks 21 are then operated to lower the arms 19a and 19b so that the suction cups 20a and 20b come into contact with the blank which has just been scored. The blank is raised by the arms 19a and 19b, which preferably raise one side of the glass before the other so as to unstick it from the stack. The carriage 22 is then driven laterally to remove the blank from the stack and carry it to a breaking station (not shown).

To bring the succeeding blank, now on top of the stack, into the scoring position, the platform 15 is then raised by the jacks 16 by an amount equal to the thickness of a blank and a new scoring cycle begins.

When all the blanks in the stack have been cut and removed, the platform 15 is lowered by means of the motor 18 and the pallet 2 is displaced by means of the chain drive system 3, in the direction of a supply station, to receive a new stack of blanks. The new stack is then centered with respect to the cutting head by centering the pallet 2, and by actuating the jacks 14a and 14b to center the uppermost blank. The scoring tool is then brought into contact with the uppermost blank, and the operation resumed.

It will be noted that all these operations can be rendered automatic and synchronized by means of a suitable control device (not shown).

This procedure of scoring glass sheets, while still stacked, avoids the normal glass handling operations of the prior art. It also saves a considerable amount of space over the conventional systems owing to the fact that it eliminates a discharging machine and a waiting station. Lastly, it makes it possible to produce a "deeper" cut in the blanks using reduced pressure, as the scoring operation is carried out on a hard support — the stack of blanks — and not on a pad, as is generally the case.

I claim:

1. A process for continually cutting glass blanks comprising moving a stack of blanks into position beneath a cutting head carrying a scoring tool and having a reference templet associated therewith, bringing said scoring tool into contact with the uppermost blank of said stack and actuating the cutting head to produce a score line in the uppermost blank under guidance of said templet, withdrawing the cutting tool from the uppermost blank and removing the blank from the stack to expose the next uppermost blank, relatively moving the stack and cutting head closer together by a distance equal to the thickness of a blank, and repeating the actuation of the cutting head to produce a score line in the then uppermost blank of the stack under guidance of said templet.

2. A process according to claim 1 in which the stack of blanks is raised to produce said relative moving of the stack and cutting head closer together.

3. A process according to claim 1 in which the cutting head is lowered to produce said relative moving of the stack and cutting head closer together.

4. Apparatus for continually cutting glass blanks comprising a cutting head and a templet for guiding the movement thereof, support means for supporting a stack of blanks beneath the cutting head, means for actuating said cutting head to score a line in the uppermost blank of said stack, pick-up means for removing the uppermost blank from the stack after the scoring thereof, and means for relatively moving the stack and cutting head closer together by a distance equal to the thickness of a blank to bring the succeeding blank into position for scoring by said cutting head.

5. Apparatus according to claim 4 in which said pickup means includes suction-cup means disposed above the stack of blanks and movable to a position over the stack for picking up a blank therefrom and to a position laterally away from the stack.

6. Apparatus according to claim 5 in which said suction-cup means includes two parallel arms bearing suction cups and mounted on a carriage, said carriage being mounted for movement toward and away from said stack.

7. Apparatus according to claim 4 in which said means for moving the stack and cutting head closer together includes jack means for raising said support means step-by-step.

8. Apparatus according to claim 4 including centering means for centering said stack of blanks with respect to said cutting head.

9. Apparatus according to claim 4 in which said support means is mounted on longitudinal and transverse roller tracks, and including means for centering said support means with respect to said cutting head.

10. Apparatus according to claim 9 including lead screw means for centering said support means along said transverse roller track.

11. Apparatus according to claim 4 including centering means adjacent the top of said stack for centering the uppermost blank of the stack with respect to said cutting head.

12. Apparatus according to claim 11 in which said centering means includes jack means positioned on the sides of said stack.

13. Apparatus according to claim 4 in which said support means is mounted on longitudinal and transverse roller tracks, and including means for centering said support means with respect to said cutting head, jack means positioned on the sides of the stack adjacent the top thereof for centering the uppermost blank with respect to said cutting head, said pick-up means including two parallel arms bearing suction cups for picking up a blank from said stack, said arms being mounted on a carriage movable toward and away from said stack, and said means for moving the stack and cutting head closer together including jack means for raising said support means step-by-step.

14. Apparatus according to claim 13 in which said means for centering said support means includes lead screw means for centering the support means along said transverse roller track.

* * * * *